(12) United States Patent
Kato

(10) Patent No.: US 11,489,224 B2
(45) Date of Patent: Nov. 1, 2022

(54) BATTERY PACK

(71) Applicant: TOYOTA JIDOSHA KABUSHIKI KAISHA, Toyota (JP)

(72) Inventor: Masashi Kato, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 16/373,907

(22) Filed: Apr. 3, 2019

(65) Prior Publication Data
US 2019/0341589 A1 Nov. 7, 2019

(30) Foreign Application Priority Data
May 2, 2018 (JP) .............................. JP2018-088805

(51) Int. Cl.
*H01M 50/20* (2021.01)
*H01M 50/209* (2021.01)
*H01M 50/204* (2021.01)
*H01M 50/264* (2021.01)
*H01M 50/289* (2021.01)
*H01M 50/242* (2021.01)
*H01M 50/291* (2021.01)

(52) U.S. Cl.
CPC .......... *H01M 50/20* (2021.01); *H01M 50/204* (2021.01); *H01M 50/209* (2021.01); *H01M 50/242* (2021.01); *H01M 50/264* (2021.01); *H01M 50/289* (2021.01); *H01M 50/291* (2021.01); *H01M 2220/20* (2013.01)

(58) Field of Classification Search
CPC .. H01M 50/20; H01M 50/204; H01M 50/209; H01M 50/242; H01M 50/264; H01M 50/289; H01M 50/291
See application file for complete search history.

(56) References Cited

U.S. PATENT DOCUMENTS

| | | | | |
|---|---|---|---|---|
| 2011/0262797 A1* | 10/2011 | Kim | ...................... | H01M 50/20 429/149 |
| 2013/0164592 A1* | 6/2013 | Maguire | ................ | H01M 50/20 429/120 |
| 2015/0004469 A1* | 1/2015 | Park | ....................... | H01M 50/20 429/151 |
| 2015/0340669 A1* | 11/2015 | Aoki | ................... | H01M 50/209 429/151 |
| 2016/0240827 A1 | 8/2016 | Sakurai | | |

FOREIGN PATENT DOCUMENTS

| | | |
|---|---|---|
| JP | 2010-009989 A | 1/2010 |
| JP | 2010-257650 A | 11/2010 |
| JP | 2016-091991 A | 5/2016 |
| JP | 2016149244 A | 8/2016 |

* cited by examiner

*Primary Examiner* — Jonathan G Jelsma
(74) *Attorney, Agent, or Firm* — Dickinson Wright, PLLC

(57) ABSTRACT

A battery pack includes a sub-end plate disposed between a cell stack and a main end plate. The sub-end plate includes a first surface that faces the cell stack, and a second surface that faces the main end plate. A contact portion that protrudes toward and comes into contact with the main end plate, and a non-contact portion that is positioned laterally with respect to the contact portion, and forms a space between the non-contact portion and the main end plate and does not come into contact with the main end plate at least when the main end plate is not elastically deformed in a direction away from the cell stack by being pressed by the contact portion are formed on the second surface.

8 Claims, 13 Drawing Sheets ize of the battery pack
BATTERY PACK

CROSS REFERENCE TO RELATED APPLICATIONS

The present application claims priority based on Japanese Patent Application No. 2018-088805 filed on May 2, 2018, the entire contents of which are incorporated herein by reference in its entirety.

BACKGROUND OF THE INVENTION

Field of the Invention

The present invention relates to a battery pack having a cell stack in which a plurality of chargeable and dischargeable unit cells are electrically connected to each other.

Description of the Related Art

A secondary battery such as a lithium ion secondary battery is used as what is called a portable power source for a personal computer or a cellular phone, or a power source for driving a vehicle. In the case where the secondary battery is used as the power source for driving a vehicle, the secondary battery is used in the form of a battery pack in which a plurality of unit cells (battery cells) are arranged in a predetermined direction in order to enable high output.

In the battery pack, in order to prevent the positional displacement of unit cells caused by vibrations or impacts during running of a vehicle and ensure battery properties and battery life, it is necessary to apply an appropriate predetermined binding load to the unit cells. In general, such a binding load is vertically applied to an electrode surface in the unit cell. For example, Japanese Patent Application Publication No. 2010-009989 discloses a battery pack that includes a cell stack in which a plurality of unit cells are arranged in a predetermined direction, a pair of end plates that are disposed at both end portions of the cell stack, and a plurality of tie rods (i.e., binding members) that couple the pair of end plates together and apply a binding load between the pair of end plates.

Incidentally, when the battery pack is used, charge and discharge are performed in each unit cell of the cell stack. When charge and discharge are performed in the unit cell, the unit cell sometimes expands in an arrangement direction. At this point, the appropriate binding load is applied to the cell stack by the binding members in the arrangement direction, and hence there is a possibility that the binding load applied to each unit cell is increased by the expansion of each unit cell. When the binding load applied to the unit cell significantly exceeds the appropriate predetermined binding load, there is a possibility that battery properties of the unit cell deteriorate or the unit cell itself is damaged. In the technique described in Japanese Patent Application Publication No. 2010-009989, a spring is disposed between the end plate and the unit cell, and hence a load generated when the unit cell expands can be absorbed in the spring. However, in order for the binding load applied to the unit cell when the unit cell expands to have an appropriate value, it is necessary to increase the length or thickness of the spring, and hence an increase in the size of the battery pack is inevitable. Note that each of Japanese Patent Application Publication No. 2016-091991 and Japanese Patent Application Publication No. 2010-257650 discloses a structure that can absorb the load generated when the unit cell expands.

SUMMARY OF THE INVENTION

The present invention has been made in views of such points, and an object thereof is to provide a battery pack capable of preventing an excessive load from being applied to a cell stack while preventing an increase in the size of the battery pack.

The battery pack according to the present invention is a battery pack including: a cell stack in which a plurality of chargeable and dischargeable unit cells are arranged in a first direction in a state in which the plurality of chargeable and dischargeable unit cells are electrically connected to each other; a pair of main end plates that are disposed at both end portions of the cell stack in the first direction and are elastically deformable; a pair of binding members that extend in the first direction, have the cell stack disposed between the pair of binding members, couple the pair of main end plates together, and apply a binding load between the pair of main end plates; and a pair of sub-end plates that are each disposed between the cell stack and each of the main end plates, wherein each of the sub-end plates includes a first surface that faces the cell stack and a second surface that faces one of the main end plates, and a contact portion that protrudes toward the main end plate and comes into contact with the main end plate, and a non-contact portion that is positioned laterally with respect to the contact portion, and forms a space between the non-contact portion and the main end plate and does not come into contact with the main end plate at least when the main end plate is not elastically deformed in a direction away from the cell stack by being pressed by the contact portion are formed on the second surface.

According to the battery pack of the present invention, when each unit cell of the cell stack expands, the contact portion formed on the second surface of the sub-end plate presses the main end plate at a predetermined load. The main end plate is formed so as to be elastically deformable, and hence the main end plate is elastically deformed in the direction away from the cell stack. Herein, the non-contact portion that is positioned laterally with respect to the contact portion is formed on the second surface of the sub-end plate, and hence the sub-end plate can locally press the main end plate as compared with the case where the non-contact portion is not formed on the second surface. That is, it is possible to apply a load intensively to the specific part of the main end plate (i.e., the part thereof that comes into contact with the contact portion) from the sub-end plate, and hence it is possible to elastically deform the main end plate in the direction away from the cell stack by a larger amount. As a result, a load generated by the extension of the entire cell stack in a predetermined direction when each unit cell of the cell stack expands can be absorbed in the main end plate, and it is possible to reduce the binding load applied to the cell stack. Thus, with the configuration in which the sub-end plate on which the contact portion and the non-contact portion are formed is disposed between the cell stack and the main end plate, it is possible to prevent an excessive load from being applied to the cell stack while preventing an increase in the size of the battery pack.

In a preferred aspect of the battery pack disclosed herein, the contact portion is positioned in a central part of the second surface in a second direction orthogonal to the first direction in plan view, and is positioned in a central part of the second surface in a third direction orthogonal to the first direction in side view. With this, it is possible to apply the load intensively to the substantially central part of the main end plate from the sub-end plate, and hence it is possible to elastically deform the main end plate in the direction away from the cell stack by a larger amount.

In a preferred aspect of the battery pack disclosed herein, the contact portion extends in a second direction orthogonal to the first direction in plan view, and the pair of binding members are disposed above and below the cell stack with respect to a third direction orthogonal to the first direction in side view. With this, it is possible to apply the load intensively to the most part of the main end plate in the second direction from the sub-end plate, and hence it is possible to elastically deform the main end plate in the direction away from the cell stack by a larger amount.

In a preferred aspect of the battery pack disclosed herein, the contact portion may extend in a second direction orthogonal to the first direction in plan view, and the pair of binding members may be disposed in one direction and another direction of the cell stack with respect to the second direction. With this, it is possible to apply the load intensively to the most part of the main end plate in the second direction from the sub-end plate, and hence it is possible to elastically deform the main end plate in the direction away from the cell stack by a larger amount.

In a preferred aspect of the battery pack disclosed herein, the pair of binding members may be disposed in one direction and another direction of the cell stack with respect to a second direction orthogonal to the first direction in plan view, and the contact portion may extend in a third direction orthogonal to the first direction in side view. With this, it is possible to apply the load intensively to the most part of the main end plate in the third direction from the sub-end plate, and hence it is possible to elastically deform the main end plate in the direction away from the cell stack by a larger amount.

In a preferred aspect of the battery pack disclosed herein, the pair of binding members may be disposed above and below the cell stack with respect to a third direction orthogonal to the first direction in side view, and the contact portion may extend in the third direction. With this, it is possible to apply the load intensively to the most part of the main end plate in the third direction from the sub-end plate, and hence it is possible to elastically deform the main end plate in the direction away from the cell stack by a larger amount.

In a preferred aspect of the battery pack disclosed herein, the contact portion may come into surface contact with the main end plate. When the main end plate and the sub-end plate are fixed to each other, it is possible to fix the main end plate and the sub-end plate to each other at a part of the surface contact using, e.g., a bolt or the like, and hence mounting is facilitated.

In a preferred aspect of the battery pack disclosed herein, the contact portion may come into line contact with the main end plate. It is possible to apply the load from the sub-end plate to the main end plate more locally, and hence it is possible to elastically deform the main end plate in a direction further away from the cell stack.

In a preferred aspect of the battery pack disclosed herein, the contact portion may come into point contact with the main end plate. It is possible to apply the load from the sub-end plate intensively to a point of the main end plate, and hence it is possible to elastically deform the main end plate in the direction further away from the cell stack.

In a preferred aspect of the battery pack disclosed herein, the non-contact portion is formed so as to be away from the main end plate with respect to the first direction as the non-contact portion is away from the contact portion. With this, when the main end plate is elastically deformed in the direction away from the cell stack using the contact portion so as to reach a predetermined position, the non-contact portion can come into contact with the main end plate, and hence it is also possible to elastically deform the main end plate in the direction away from the cell stack using the non-contact portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
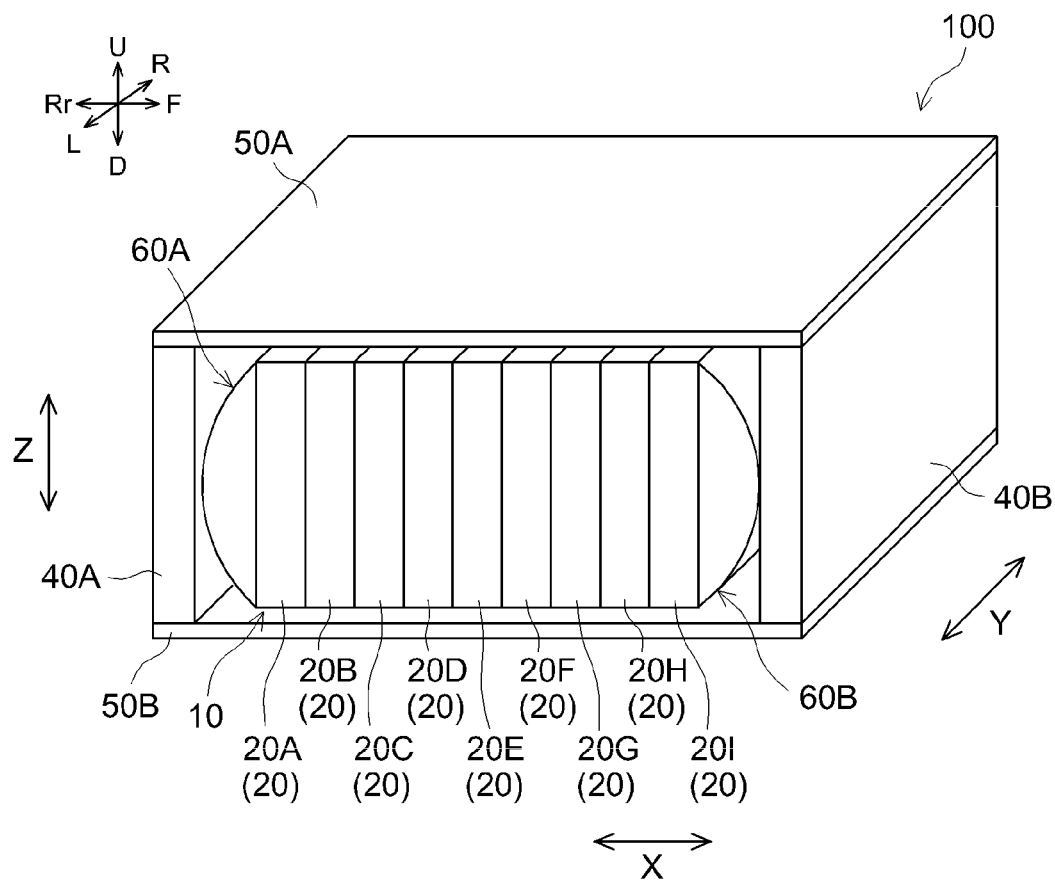
FIG. 1 is a perspective view schematically showing a battery pack according to an embodiment.

Hereinbelow, a battery pack according to an embodiment of the present invention will be described by taking, as an example, a battery pack that uses a lithium ion secondary battery as a unit cell and includes a plurality of the lithium ion secondary batteries. Note that the unit cell used in the battery pack disclosed herein is not limited to the lithium ion secondary battery, and it is also possible to use, e.g., a secondary battery such as a nickel-metal hydride battery or a power storage element such as a capacitor.

In addition, in the following drawings, members and portions that have the same functions are designated by the same reference numerals, and the description thereof will be made. Note that the dimensional relationship (length, width, thickness, and the like) in the individual drawings may not necessarily reflect the actual dimensional relationship in an accurate manner. Apart from matters that are specifically mentioned in this specification, other matters that are necessary for implementing the present invention (e.g., a material of an electrode body, a method for manufacturing a unit cell, and the like) can be understood as design matters of those skilled in the art based on conventional technologies in the field.

FIG. 1 is a perspective view schematically showing a battery pack 100 according to the present embodiment. Reference marks F, Rr, L, R, U, and D in the drawing denote front, rear, left, right, up, and down. In addition, a reference mark X in the drawing indicates an arrangement direction of a unit cell 20. Herein, the arrangement direction X is a front-rear direction X. The arrangement direction X (front-rear direction X) is an example of a first direction. A reference mark Y in the drawing indicates a left-right direction, and the left-right direction is orthogonal to the arrangement direction X in plan view. The left-right direction Y is an example of a second direction. A reference mark Z in the drawing indicates an up-down direction, and the up-down direction is orthogonal to the arrangement direction X in side view. The up-down direction Z is an example of a third direction. Note that the directions are only directions determined for the convenience of description, and are not intended to limit the installation mode of the battery pack 100 or the present invention.

As shown in FIG. 1, the battery pack 100 includes a cell stack 10 having a plurality of unit cells 20, a pair of main end plates 40A and 40B, a pair of binding members 50A and 50B, and a pair of sub-end plates 60A and 60B.

As shown in FIG. 1, the cell stack 10 includes a plurality of chargeable and dischargeable unit cells that are a first unit cell 20A, a second unit cell 20B, a third unit cell 20C, a fourth unit cell 20D, a fifth unit cell 20E, a sixth unit cell 20F, a seventh unit cell 20Q an eighth unit cell 20H, and a ninth unit cell 20I. Hereinafter, the first to ninth unit cells 20A to 20I are sometimes collectively referred to as a unit cell or unit cells 20. The first to ninth unit cells 20A to 20I are arranged side by side in the front-rear direction X in a state in which the unit cells are electrically connected to each other. The first to ninth unit cells 20A to 20I are electrically connected in series or parallel. The first to ninth unit cells 20A to 20I are formed into the same shape. A member other than the unit cell 20 (e.g., a cooling plate or the like) may be provided between the first to ninth unit cells 20A to 20I.

Figure 2:
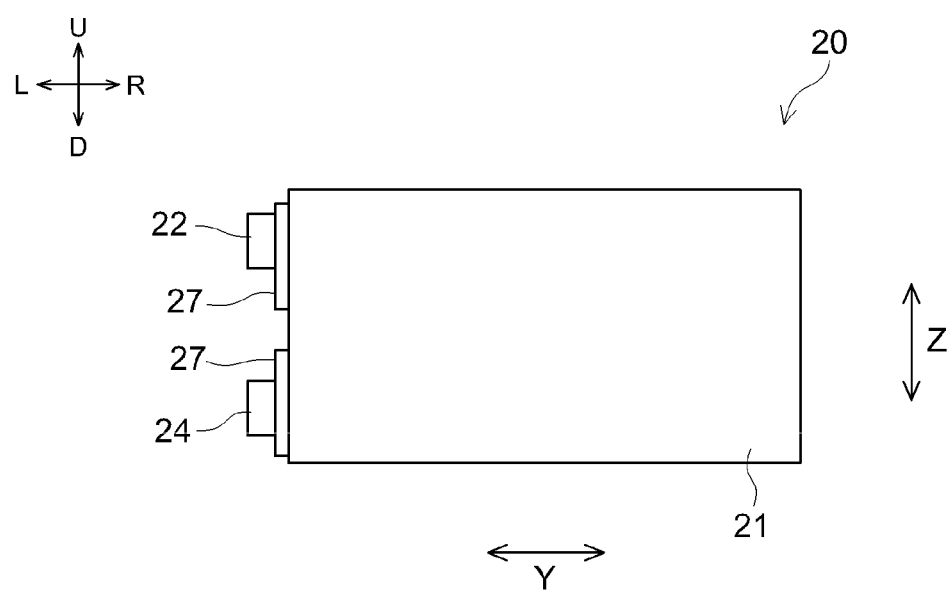
FIG. 2 is a front view schematically showing a unit cell used in the battery pack according to the embodiment.

The unit cell 20 is, e.g., an all-solid lithium ion secondary battery. As shown in FIG. 2, the unit cell 20 includes an outer sheath 21. In the present embodiment, a laminate film is used as the outer sheath 21. Inside the laminate film, a multilayer electrode body constituted by stacking a predetermined number of positive electrodes, a predetermined number of negative electrodes, and a predetermined number of solid electrolyte layers is accommodated. As the positive electrode, the negative electrode, and a solid electrolyte used in the solid electrolyte layer, it is possible to use those used in conventional common all-solid lithium ion secondary batteries without any particular limitation. Examples of the solid electrolyte include various oxide-based solid electrolytes or sulfide-based solid electrolytes. Note that the unit cell 20 may also be a nonaqueous electrolyte secondary battery that includes an electrode body constituted by a positive electrode, a negative electrode, and a separator, and a nonaqueous electrolyte solution.

As shown in FIG. 2, the unit cell 20 includes a positive electrode terminal 22 connected to the position electrode, and a negative electrode terminal 24 connected to the negative electrode. Each of the positive electrode terminal 22 and the negative electrode terminal 24 is a long plate-like member having conductivity. Part of each of the positive electrode terminal 22 and the negative electrode terminal 24 is exposed to the outside of the outer sheath 21. In the present embodiment, part of each of the positive electrode terminal 22 and the negative electrode terminal 24 is exposed to the outside from the left end of the outer sheath 21. Part of each pf the positive electrode terminal 22 and the negative electrode terminal 24 may also be exposed to the outside from the right end of the outer sheath 21. The unit cell 20 includes insulating holders 27 that hold the positive electrode terminal 22 and the negative electrode terminal 24 exposed to the outside of the outer sheath 21. Note that the positive electrode terminal 22 and the negative electrode terminal 24 in the battery pack 100 are depicted only in FIG. 3, and the depiction thereof is omitted in the other drawings.

Figure 3:
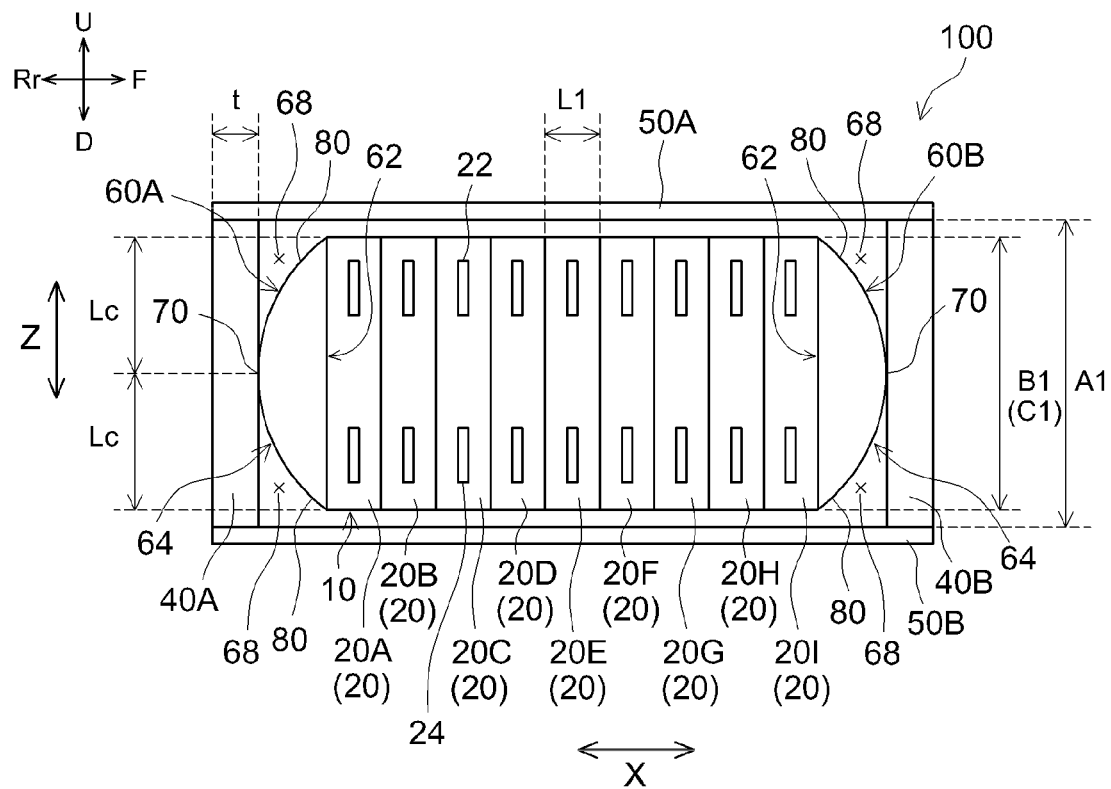
FIG. 3 is a side view schematically showing the battery pack according to the embodiment.
Figure 4:
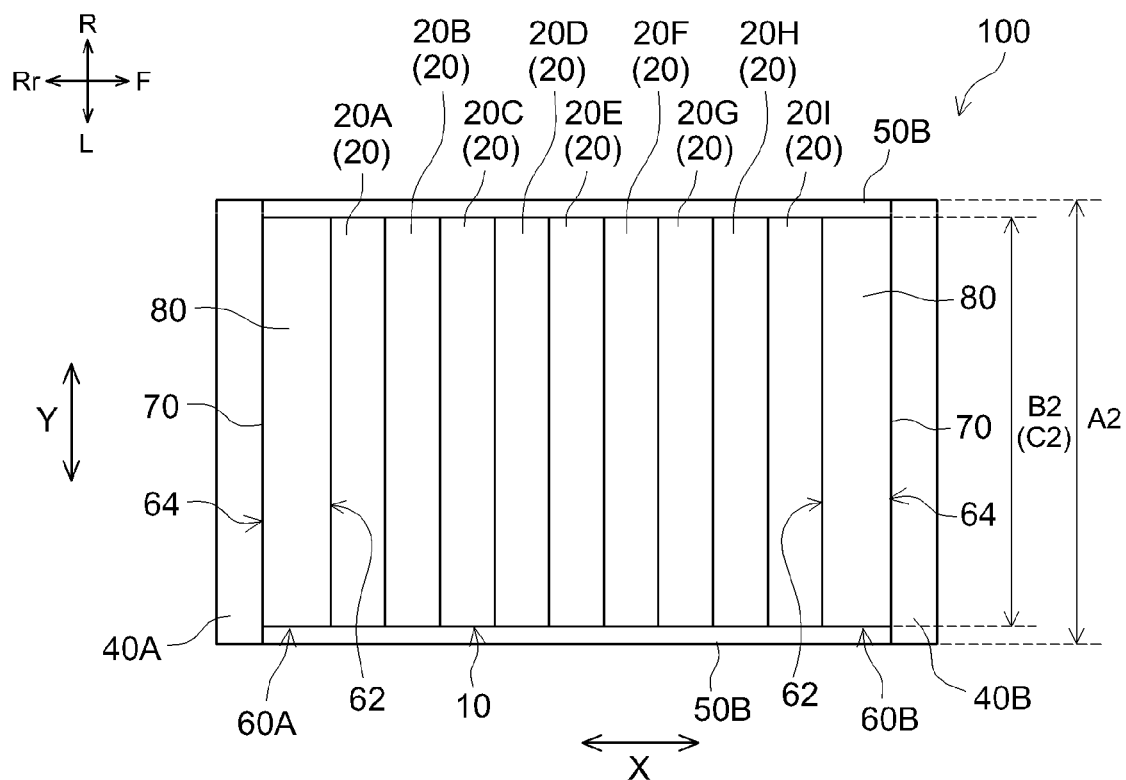
FIG. 4 is a plan view schematically showing the battery pack according to the embodiment.

As shown in FIG. 3, the pair of main end plates 40A and 40B are disposed at both end portions of the cell stack 10 in the arrangement direction X. The main end plate 40A and the main end plate 40B are formed into the same shape. The main end plate 40A is disposed at the end portion of the cell stack 10 on a first side in the arrangement direction X, and the main end plate 40B is disposed at the end portion of the cell stack 10 on a second side in the arrangement direction X. The main end plate 40A is disposed in the rear of the first unit cell 20A. The main end plate 40B is disposed in front of the ninth unit cell 20I. The main end plates 40A and 40B are formed so as to be elastically deformable. The main end plate 40A is formed so as to be bendable rearward. The main end plate 40A bends such that part of the main end plate 40A is positioned rearward of the rear ends of the binding members 50A and 50B. The main end plate 40B is formed so as to be bendable frontward. The main end plate 40B bends such that part of the main end plate 40B is positioned frontward of the front ends of the binding members 50A and 50B. The main end plates 40A and 40B receive a binding load of the binding members 50A and 50B, and loads from the sub-end plates 60A and 60B. Accordingly, a material and a shape that can bear the loads are used as the material and the shape of each of the main end plates 40A and 40B. The main end plates 40A and 40B may be made of metal or resin, and may also be made of, e.g., carbon steel. Each of the main end plates 40A and 40B is formed into a plate-like shape. A length A1 of each of the main end plates 40A and 40B in the up-down direction Z is longer than a length B1 of the unit cell 20 in the up-down direction Z. As shown in FIG. 4, a length A2 of each of the main end plates 40A and 40B in the left-right direction Y is longer than a length B2 of the unit cell 20 in the left-right direction Y. Note that the depiction of the binding member 50A is omitted in FIG. 4 for the convenience of description.

As shown in FIG. 1, the pair of binding members 50A and 50B extend in the arrangement direction X. The binding member 50A and the binding member 50B are formed into the same shape. Each of the binding members 50A and 50B is formed into a plate-like shape. The cell stack 10 is disposed between the binding members 50A and 50B. The binding members 50A and 50B are spaced from the cell stack 10. That is, the binding members 50A and 50B are not in contact with the cell stack 10. The binding members 50A and 50B face each other via the cell stack 10. The binding member 50A is disposed above the cell stack 10. The binding member 50B is disposed below the cell stack 10. The binding members 50A and 50B couple the pair of main end plates 40A and 40B together. That is, the binding member 50A couples the upper end of the main end plate 40A to the upper end of the main end plate 40B. The binding member 50B couples the lower end of the main end plate 40A to the lower end of the main end plate 40B. The main end plates 40A and 40B and the binding members 50A and 50B are fixed to each other using fastening members such as, e.g., bolts. The binding members 50A and 50B apply a predetermined binding load between the pair of main end plates 40A and 40B with respect to the arrangement direction X. That is, the binding members 50A and 50B apply the predetermined binding load to each unit cell 20 of the cell stack 10 via the main end plates 40A and 40B and the sub-end plates 60A and 60B with respect to the arrangement direction X. While the binding members 50A and 50B are formed of the same material as that of the main end plates 40A and 40B in the present embodiment, the binding members 50A and 50B may be formed of a material different from that of the main end plates 40A and 40B.

As shown in FIG. 3, the pair of sub-end plates 60A and 60B are disposed at both end portions of the cell stack 10 in the arrangement direction X. The sub-end plate 60A is disposed between the cell stack 10 and the main end plate 40A. The sub-end plate 60A is disposed in the rear of the first unit cell 20A of the cell stack 10. The sub-end plate 60B is disposed between the cell stack 10 and the main end plate 40B. The sub-end plate 60B is disposed in front of the ninth unit cell 20I of the cell stack 10. In the present embodiment, while the sub-end plate 60A is in direct contact with the first unit cell 20A, a cooling member or the like may be disposed between the sub-end plate 60A and the first unit cell 20A. While the sub-end plate 60B is in direct contact with the ninth unit cell 20I, the cooling member or the like may be disposed between the sub-end plate 60B and the ninth unit cell 20I. The sub-end plates 60A and 60B are disposed so as to be spaced from the binding members 50A and 50B. The sub-end plate 60A and the sub-end plate 60B are formed into the same shape. A length C1 of each of the sub-end plates 60A and 60B in the up-down direction Z is shorter than the length A1 of each of the main end plates 40A and 40B in the up-down direction Z. As shown in FIG. 4, a length C2 of each of the sub-end plates 60A and 60B in the left-right direction Y is shorter than the length A2 of each of the main end plates 40A and 40B in the left-right direction Y. While the length C1 is equal to the length B1 of the unit cell 20 in the up-down direction Z in the present embodiment, the length C1 may be different from the length B1 thereof. While the length C2 is equal to the length B2 of the unit cell 20 in the left-right direction Y, the length C2 may be different from the length B2 thereof. While the sub-end plates 60A and 60B are formed of the same material as that of the main end plates 40A and 40B in the present embodiment, the sub-end plates 60A and 60B may be formed of a material different from that of the main end plates 40A and 40B.

Figure 5:
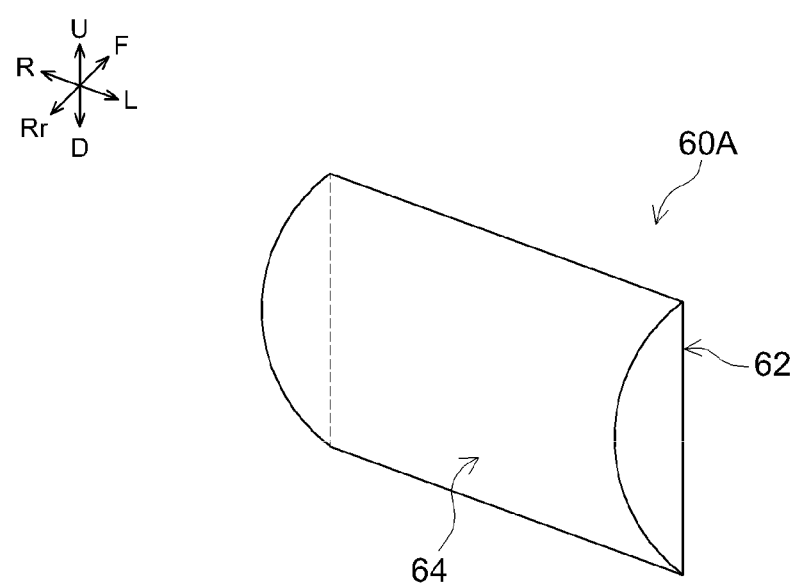
FIG. 5 is a perspective view schematically showing the configuration of a sub-end plate according to the embodiment.

Hereinbelow, the detailed configuration of each of the sub-end plates 60A and 60B will be described. Note that the sub-end plates 60A and 60B have the same configuration except that the sub-end plates 60A and 60B are disposed so as to be symmetrical with respect to the arrangement direction X, and hence the sub-end plate 60A will be described and the description of the sub-end plate 60B, which is the same as that of the sub-end plate 60A, will be omitted. As shown in FIG. 5, the sub-end plate 60A is formed into a semi-cylindrical shape. As shown in FIG. 3, the sub-end plate 60A is formed into a semi-circular shape in side view. The sub-end plate 60A includes a first surface 62 (see also FIG. 5) that faces the cell stack 10, and a second surface 64 (see also FIG. 5) that faces the main end plate 40A. The first surface 62 faces the first unit cell 20A. The size of the first surface 62 may be equal to or larger than that of the wide surface (surface parallel to the positive electrode and the negative electrode) of the outer sheath 21 of the unit cell 20. A contact portion 70 and non-contact portions 80 are formed on the second surface 64 of the sub-end plate 60A.

As shown in FIG. 3, the contact portion 70 protrudes toward the main end plate 40A. The contact portion 70 protrudes rearward. The contact portion 70 comes into contact with the main end plate 40A. The contact portion 70 is positioned in the central part of the second surface 64 in the up-down direction Z in side view. As shown in FIG. 4, the contact portion 70 extends in the left-right direction Y in plan view. The contact portion 70 comes into point contact with the main end plate 40A in side view. The contact portion 70 comes into point contact with the central part of the main end plate 40A in the up-down direction Z in side view. The contact portion 70 comes into line contact with the main end plate 40A in plan view.

As shown in FIG. 3, the non-contact portions 80 are positioned laterally with respect to the contact portion 70. The non-contact portions 80 are preferably formed so as to be symmetrical with respect to the contact portion 70 in the left-right direction Y and/or the up-down direction Z. During a normal state, a space 68 is formed between the non-contact portion 80 and the main end plate 40A, and the non-contact portion 80 doesn't come into contact with the main end plate 40A. Herein, "during a normal state" means when the main end plate 40A is not elastically deformed in a direction away from the cell stack 10 (herein, rearward) by being pressed by the contact portion 70. Note that it is only required that the non-contact portion 80 doesn't come into contact with the main end plate 40A at least during the normal state and, as will be described later, at least part of the non-contact portion 80 may come into contact with the main end plate 40A when the main end plate 40A is elastically deformed in the direction away from the cell stack 10 by being pressed by the contact portion 70 (see FIG. 6). At this point, the non-contact portion 80 gradually comes into contact with the elastically deformed main end plate 40A from the part of the non-contact portion 80 close to the contact portion 70 toward the part thereof far from the contact portion 70. That is, in side view, the sub-end plate 60A and the main end plate 40A come into point contact with each other first and then come into surface contact with each other, and the contact area between them is gradually increased. In the present embodiment, the non-contact portion 80 is formed so as to be away from the main end plate 40A with respect to the arrangement direction X as the non-contact portion 80 is away from the contact portion 70. That is, the non-contact portion 80 bends frontward as the non-contact portion 80 is away from the contact portion 70 upward or downward. The non-contact portion 80 has a specific radius of curvature.

Figure 6:
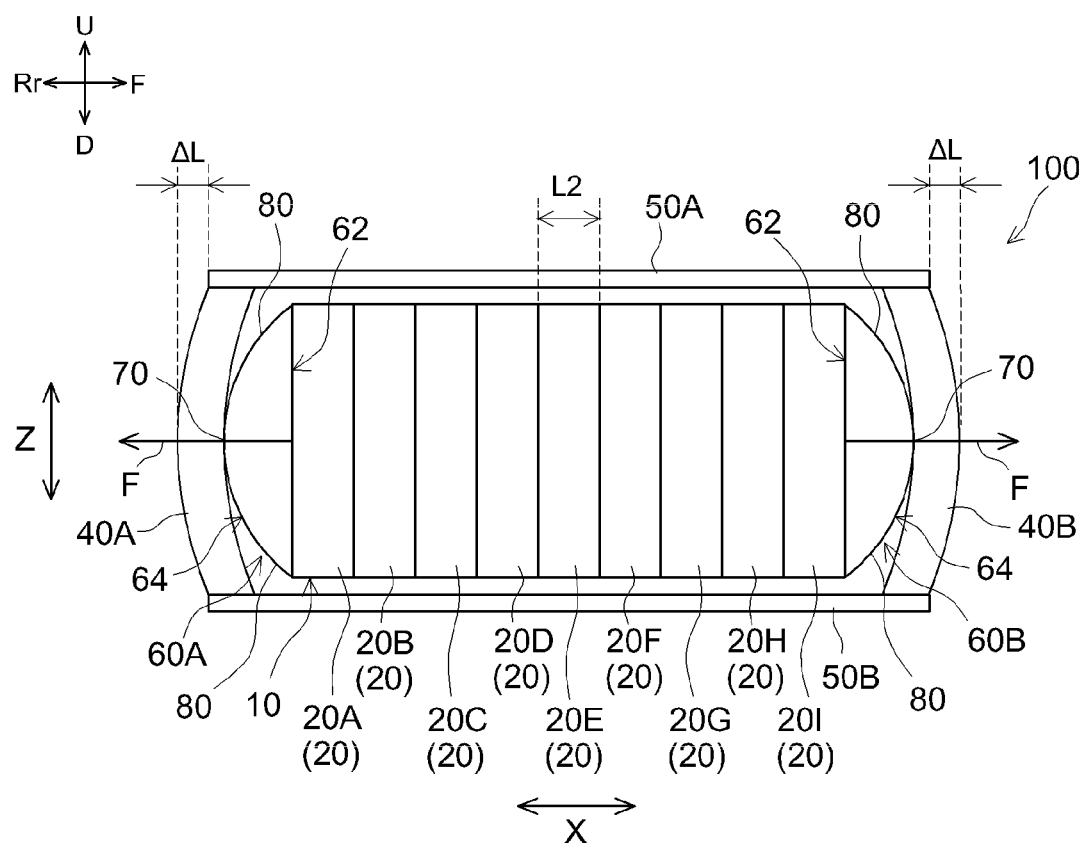
FIG. 6 is a side view schematically showing a state in which the unit cells of the battery pack according to the embodiment expand and main end plates are elastically deformed.

Next, a description will be given of the state of the battery pack 100 when each unit cell 20 of the cell stack 10 is charged. As shown in FIG. 6, when each unit cell 20 is charged, each unit cell 20 expands in the arrangement direction X. That is, the length of each unit cell 20 in the arrangement direction X is increased from a length L1 during the normal state (see FIG. 3) to a length L2 (see FIG. 6). Note that the expansion in the arrangement direction X when each unit cell 20 expands differs from one unit cell to another. When each unit cell 20 expands in the arrangement direction X, loads indicated by arrows F of FIG. 6 are applied to the main end plates 40A and 40B from the cell stack 10 via the sub-end plates 60A and 60B. That is, the contact portions 70 apply the loads indicated by the arrows F of FIG. 6 to the main end plates 40A and 40B. With this, the main end plate 40A is elastically deformed (bent) by ΔL in a direction away from the cell stack 10 (herein, rearward) with respect to the arrangement direction X, and the main end plate 40B is elastically deformed (bent) by ΔL in a direction away from the cell stack 10 (herein, frontward) with respect to the arrangement direction X. Herein, the total deformation amount (2ΔL) of the main end plates 40A and 40B is substantially equal to the expansion amount of the individual unit cells 20 of the cell stack 10 in the arrangement direction X. Accordingly, the load generated by the extension of the entire cell stack 10 in the arrangement direction X when each unit cell 20 expands is absorbed by the elastic deformation of the main end plates 40A and 40B. As a result, an excessive biding load is prevented from being applied to each unit cell 20. In addition, the deformation of the main end plates 40A and 40B is absorbed in the spaces 68 and the sub-end plates 60A and 60B press the unit cells 20, and hence variations in the binding load in the arrangement direction X that can be caused by the deformation of the main end plates 40A and 40B are eliminated in the sub-end plates 60A and 60B, and the binding load applied to the unit cells 20 from the sub-end plates 60A and 60B is made uniform (i.e., variations in surface pressure can be prevented). Note that, when each unit cell 20 returns to the original state from the expansion state, the main end plates 40A and 40B return to the original positions by the restoring forces of the main end plates 40A and 40B (see FIG. 3).

Herein, as shown in FIG. 3, when t is the thickness of each of the main end plates 40A and 40B in the arrangement direction X, and Lc is the length of the non-contact portion 80 in the up-down direction Z, $\Delta L \propto (Lc^3/t^3) \times F$ is satisfied. That is, with regard to acquisition of the predetermined load F and the predetermined deformation amount ΔL, it is possible to set the load F and the deformation amount ΔL freely by adjusting the thickness t of each of the main end plates 40A and 40B and Lc. In addition, with regard to the relationship between ΔL and F, ΔL is not directly proportional to F but is proportional to the cube of a characteristic value (Lc/t), and hence the battery pack is not designed such that the load F is increased by proportionally changing the thicknesses of the main end plates 40A and 40B or the binding members 50A and 50B, and flexibility in the design of the size or the weight of each member is increased.

While the battery pack 100 according to the embodiment of the present invention has been described in detail, the present invention is not limited to the embodiment, and various changes may be made.

Figure 7:
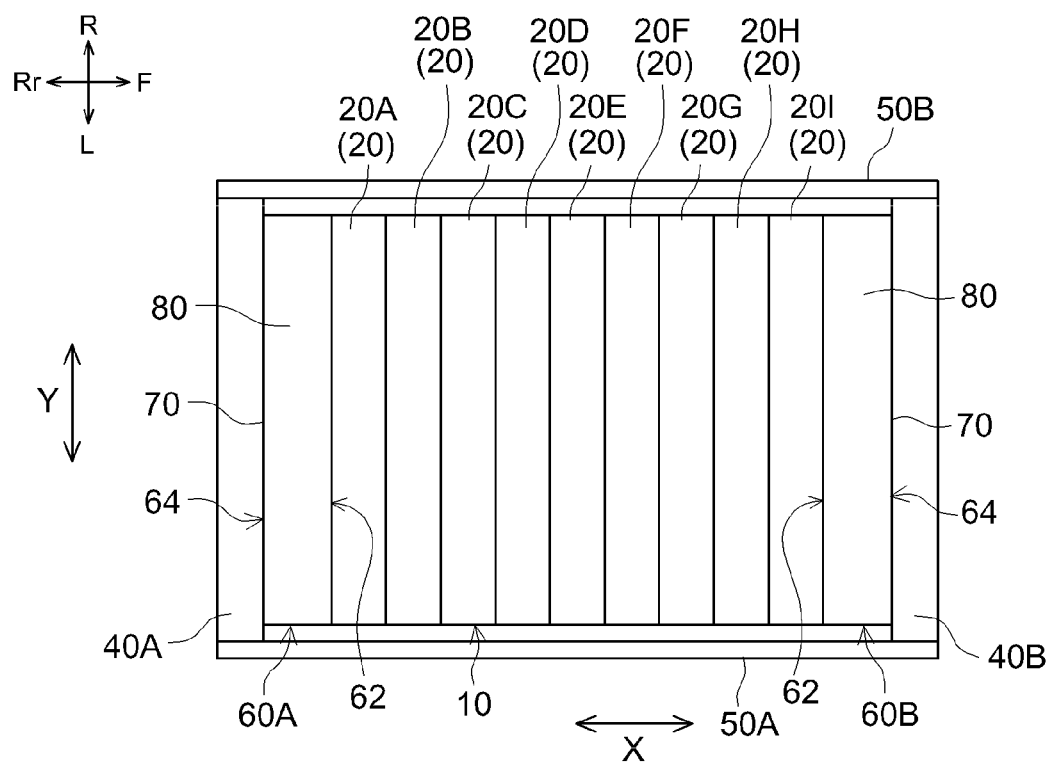
FIG. 7 is a plan view schematically showing the battery pack according to another embodiment.

As shown in FIG. 3, while the binding member 50A is disposed above the cell stack 10 and the binding member 50B is disposed below the cell stack 10 in the embodiment, the positions of the binding members 50A and 50B are not limited thereto. For example, as shown in FIG. 7, the binding member 50A may be disposed on the left of the cell stack 10, and the binding member 50B may be disposed on the right of the cell stack 10. The binding member 50A couples the left end of the main end plate 40A to the left end of the main end plate 40B. The binding member 50B couples the right end of the main end plate 40A to the right end of the main end plate 40B.

Figure 8:
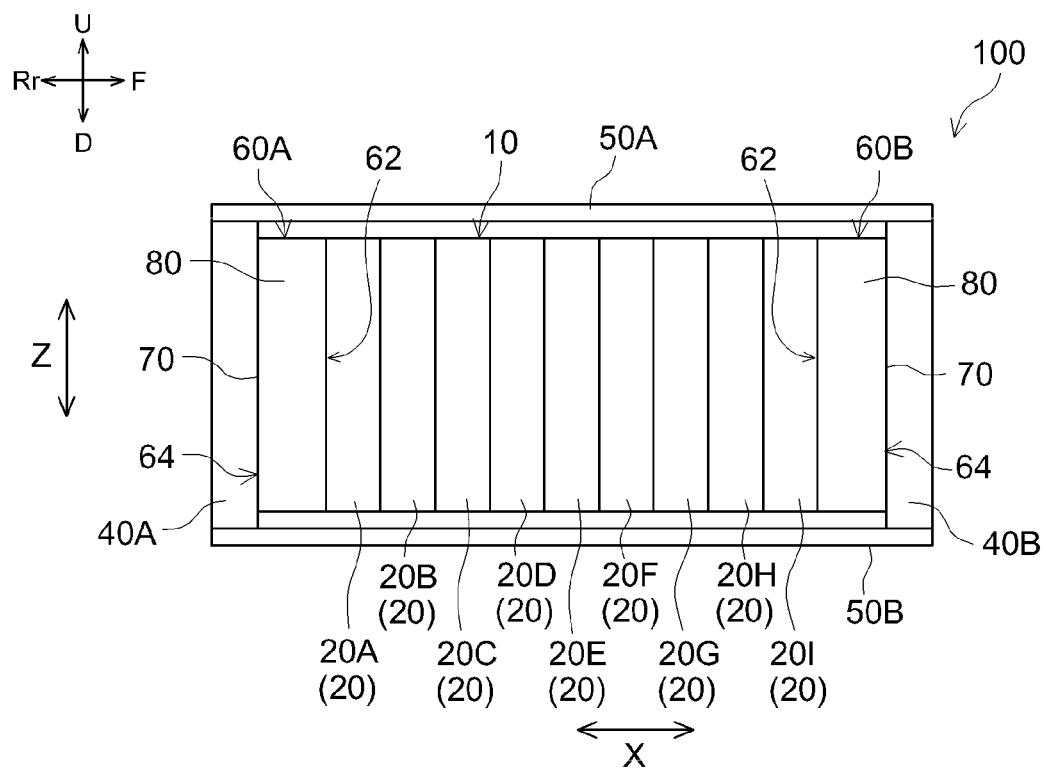
FIG. 8 is a side view schematically showing the battery pack according to another embodiment.
Figure 9:
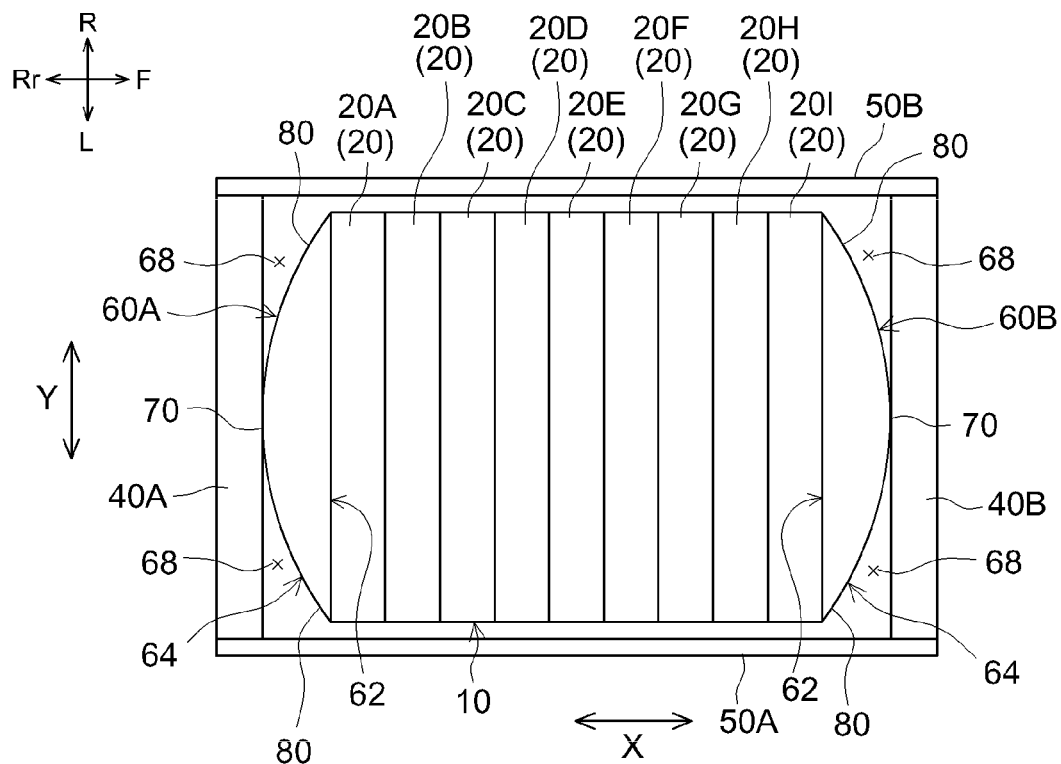
FIG. 9 is a plan view schematically showing the battery pack according to another embodiment.

In addition, as shown in FIG. 4, while the contact portion 70 extends in the left-right direction Y in plan view, the direction of extension of the contact portion 70 is not limited thereto. For example, as shown in FIG. 8, the contact portion 70 may extend in the up-down direction Z in side view. At this point, the binding member 50A is disposed above the cell stack 10, and the binding member 50B is disposed below the cell stack 10. Note that, as shown in FIG. 9, when the contact portion 70 extends in the up-down direction Z in side view, the binding member 50A may be disposed on the left of the cell stack 10, and the binding member 50B may be disposed on the right of the cell stack 10.

Figure 10:
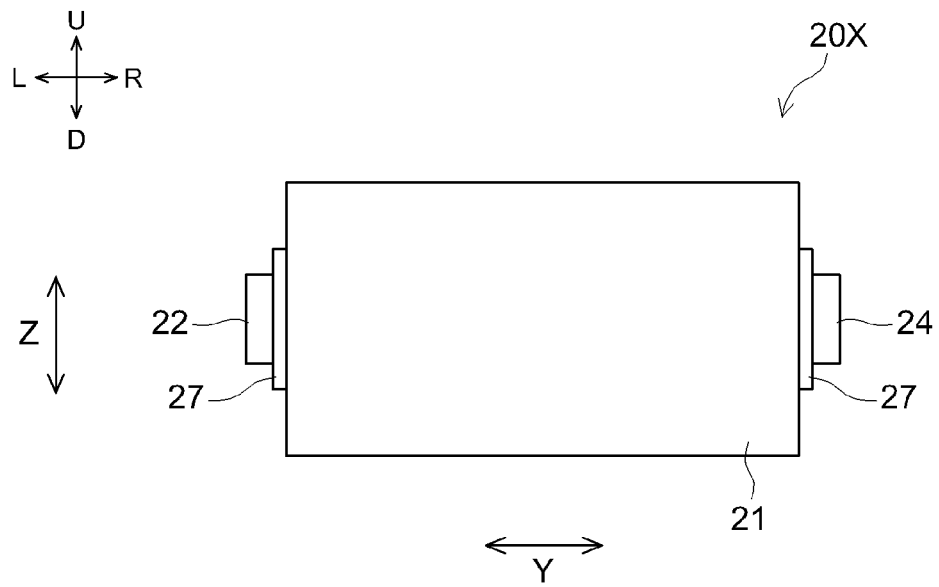
FIG. 10 is a front view schematically showing the unit cell used in the battery pack according to another embodiment.

In addition, as shown in FIG. 2, in the embodiment, both of the positive electrode terminal 22 and the negative electrode terminal 24 are provided at the first end portion of the unit cell 20. However, the structure of the unit cell is not limited to the embodiment, and it is possible to adopt various structures. For example, as shown in FIG. 10, it is also possible to use a unit cell 20X in which part of the positive electrode terminal 22 is exposed from the left end of the outer sheath 21, and part of the negative electrode terminal 24 is exposed from the right end of the outer sheath 21.

Figure 11:
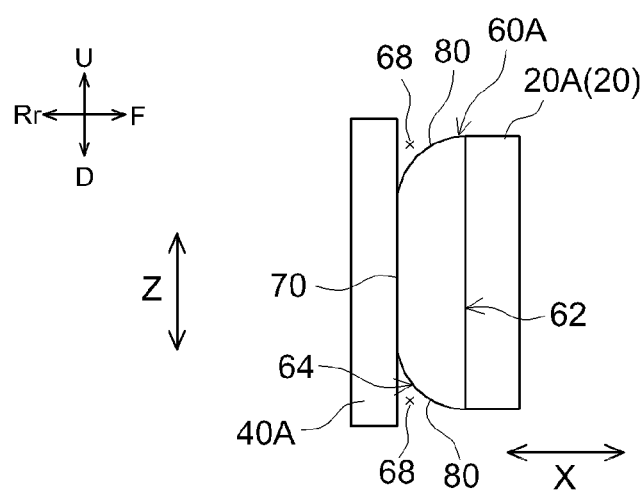
FIG. 11 is a side view schematically showing the sub-end plate and its peripheral structure according to another embodiment.
Figure 12:
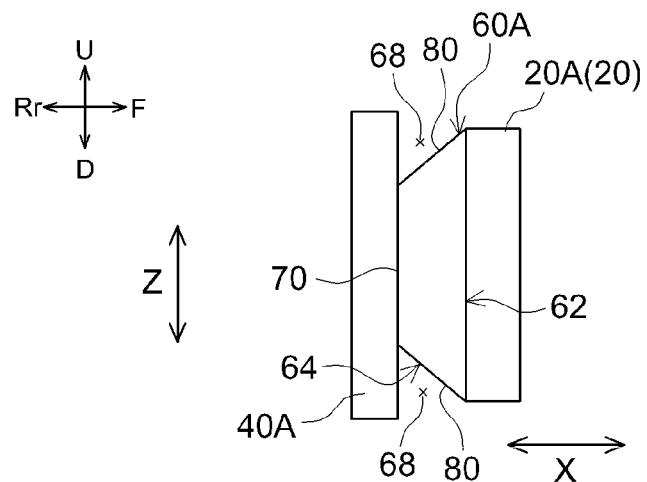
FIG. 12 is a side view schematically showing the sub-end plate and its peripheral structure according to another embodiment.

Further, as shown in FIG. 3, while the sub-end plate 60A is formed into the semi-cylindrical shape, and the contact portion 70 comes into point contact with the main end plate 40A in side view and comes into line contact with the main end plate 40A in plan view (see FIG. 4) in the embodiment, the contact portion 70 is not limited thereto. For example, as shown in FIG. 11, the contact portion 70 may come into line contact with the main end plate 40A in side view, and come into line contact with the main end plate 40A in plan view. That is, the contact portion 70 may be formed so as to come into surface contact with the main end plate 40A. Thus, since the contact portion 70 comes into surface contact with the main end plate 40A, it is possible to easily mount the main end plate 40A to the sub-end plate 60A at the contact part by using a bolt or the like. As shown in FIG. 11, the contact portion 70 extends in the up-down direction in side view, and the non-contact portion 80 bends so as to be away from the main end plate 40A with respect to the arrangement direction X as the non-contact portion 80 is away from the contact portion 70 with respect to the up-down direction Z. Note that, as shown in FIG. 12, the non-contact portion 80 may linearly incline so as to be away from the main end plate 40A with respect to the arrangement direction X as the non-contact portion 80 is away from the contact portion 70 with respect to the up-down direction Z.

Figure 13:
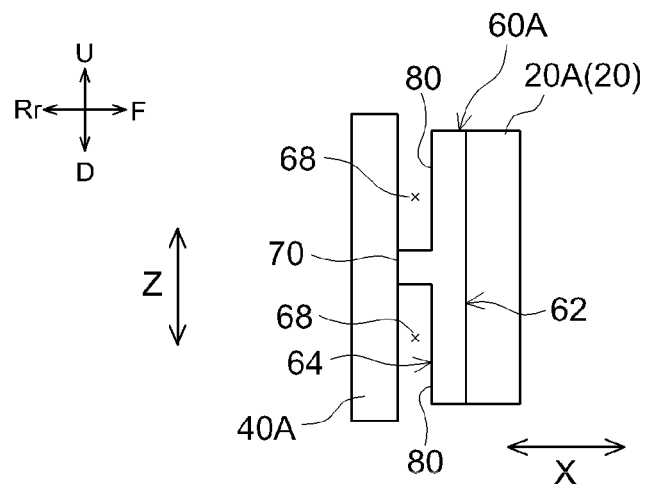
FIG. 13 is a side view schematically showing the sub-end plate and its peripheral structure according to another embodiment.
Figure 14:
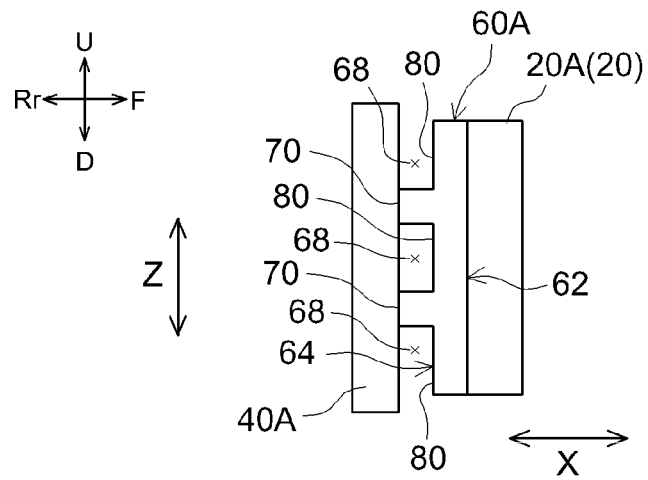
FIG. 14 is a side view schematically showing the sub-end plate and its peripheral structure according to another embodiment.

In addition, as shown in FIG. 13, the sub-end plate 60A may be formed into a T shape in side view. That is, the contact portion 70 may protrude from the non-contact portions 80 toward the main end plate 40A. Herein, the contact portion 70 is formed into a rectangular shape in side view. The contact portion 70 may also be formed so as to extend in the left-right direction Y. Note that, as shown in FIG. 14, two or more contact portions 70 may also be formed on the second surface 64 of the sub-end plate 60A.

Figure 15:
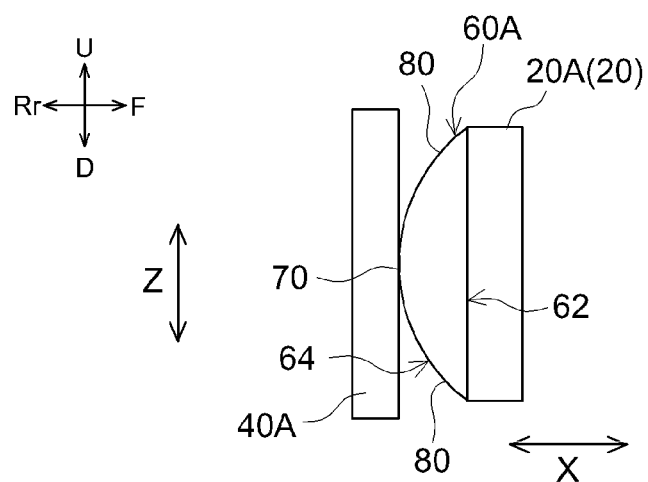
FIG. 15 is a side view schematically showing the sub-end plate and its peripheral structure according to another embodiment.
Figure 16:
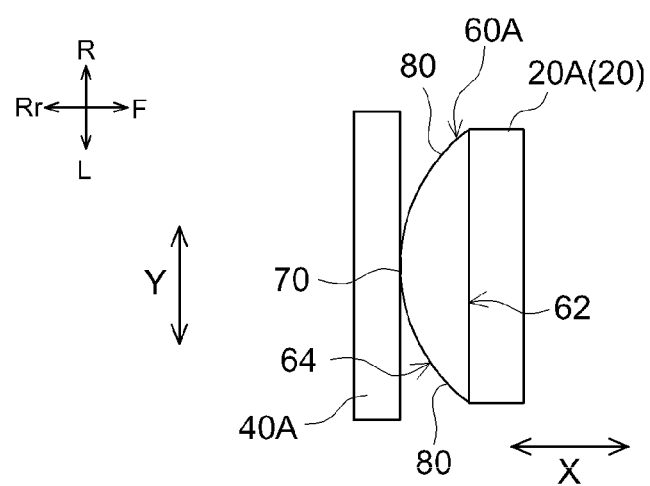
FIG. 16 is a plan view schematically showing the sub-end plate and its peripheral structure according to the other embodiment.

Further, as shown in FIG. 15 and FIG. 16, the sub-end plate 60A may be formed into a hemispherical shape. The contact portion 70 comes into point contact with the main end plate 40A. The contact portion 70 is positioned in the central part of the second surface 64 in the up-down direction Z in side view, and is positioned in the central part of the second surface 64 in the left-right direction Y in plan view. The contact portion 70 comes into point contact with the central part of the main end plate 40A in the up-down direction Z in side view. The contact portion 70 comes into point contact with the central part of the main end plate 40A in the left-right direction Y in plan view.

The battery pack 100 of each of the embodiments described above is preferably used as a power source for driving a vehicle such as a hybrid vehicle or an electric vehicle.

While the specific examples of the present invention have been described above in detail, these specific examples are merely illustrative and place no limitation on the scope of the patent claims. The technology described in the patent claims also encompasses various changes and modifications to the specific examples described above.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A battery pack comprising:
   a cell stack in which a plurality of chargeable and dischargeable unit cells are arranged in a first direction in a state in which the plurality of chargeable and dischargeable unit cells are electrically connected to each other;
   a pair of main end plates that are disposed at both end portions of the cell stack in the first direction and are elastically deformable;
   a pair of binding members that extend in the first direction, have the cell stack disposed between the pair of binding members, couple the pair of main end plates together, and apply a binding load between the pair of main end plates; and
   a pair of sub-end plates that are each disposed between the cell stack and each of the main end plates, wherein:
   each of the sub-end plates includes a first surface that faces the cell stack and a second surface that faces one of the main end plates,
   the unit cell comprises a wide surface that comes into surface contact with the first surface of the sub-end plate,
   a size of the first surface is equal to or larger than a size of the wide surface of the unit cell,
   for each of the sub-end plates, the second surface that faces one of the main end plates is convex and one of hemispherical and semi-cylindrical, and each of the main end plates includes a flat surface facing one of the sub-end plates, such the second surface of each of the sub-end plates comprises a substantially central contact portion which contacts the flat surface of one of the main end plates, and a space is formed, on at least two sides of the contact portion between non-contact portions of the second surface of the sub-end plate and the flat surface of the main end plate.

2. The battery pack according to claim 1, wherein the contact portion is positioned in a central part of the second surface in a second direction orthogonal to the first direction in plan view, and is positioned in a central part of the second surface in a third direction orthogonal to the first direction in side view.

3. The battery pack according to claim 1, wherein the contact portion extends in a second direction orthogonal to the first direction in plan view, and the pair of binding members are disposed above and below the cell stack with respect to a third direction orthogonal to the first direction in side view.

4. The battery pack according to claim 1, wherein the contact portion extends in a second direction orthogonal to the first direction in plan view, and the pair of binding members are disposed in one direction and another direction of the cell stack with respect to the second direction.

5. The battery pack according to claim 1, wherein the pair of binding members are disposed in one direction and another direction of the cell stack with respect to a second direction orthogonal to the first direction in plan view, and the contact portion extends in a third direction orthogonal to the first direction in side view.

6. The battery pack according to claim 1, wherein the pair of binding members are disposed above and below the cell stack with respect to a third direction orthogonal to the first direction in side view, and the contact portion extends in the third direction.

7. The battery pack according to claim 1, wherein the contact portion comes into surface contact with one of the pair of the main end plates.

8. The battery pack according to claim 1, wherein the non-contact portion is formed so as to be away from one of the pair of the main end plates with respect to the first direction as the non-contact portion is away from the contact portion.

* * * * *